(12) United States Patent
Casazza et al.

(10) Patent No.: US 8,659,867 B2
(45) Date of Patent: Feb. 25, 2014

(54) WIND POWER SYSTEM FOR GENERATING ELECTRIC ENERGY

(75) Inventors: Matteo Casazza, Val di Vizze (IT); Schwarz Martin, Brunico (IT)

(73) Assignee: Wilic S.A.R.L., Luxembourg (LU)

( * ) Notice: Subject to any disclaimer, the term of this patent is extended or adjusted under 35 U.S.C. 154(b) by 188 days.

(21) Appl. No.: 13/266,698

(22) PCT Filed: Apr. 29, 2010

(86) PCT No.: PCT/EP2010/055860
§ 371 (c)(1),
(2), (4) Date: Feb. 10, 2012

(87) PCT Pub. No.: WO2010/125160
PCT Pub. Date: Nov. 4, 2010

(65) Prior Publication Data
US 2012/0162850 A1    Jun. 28, 2012

(30) Foreign Application Priority Data
Apr. 29, 2009  (IT) .............................. MI2009A0725

(51) Int. Cl.
*B63H 7/00* (2006.01)
(52) U.S. Cl.
USPC .......................................... 361/221; 416/248
(58) Field of Classification Search
USPC ................... 361/221; 416/224, 248
See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Danny Nguyen
(74) *Attorney, Agent, or Firm* — Neal, Gerber & Eisenberg LLP

(57) ABSTRACT

A wind power system having a tower, a nacelle fitted to the tower to rotate about a first axis, a hub fitted to the nacelle to rotate about a second axis, and at least one blade fitted to the hub to rotate about a third axis, and wherein an elastic conducting member is positioned between the blade and the nacelle to connect the blade electrically to the nacelle.

28 Claims, 11 Drawing Sheets

(56) References Cited

U.S. PATENT DOCUMENTS

| | | |
|---|---|---|
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffman |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Ehrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |

(56) References Cited

U.S. PATENT DOCUMENTS

| | | |
|---|---|---|
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,932,574 B2 | 8/2005 | Wobben |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,687,932 B2 | 3/2010 | Casazza et al. |
| 8,186,960 B2 * | 5/2012 | Dawson et al. ........... 416/204 R |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0066098 A1 | 4/2004 | Doherty et al. |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0211173 A1 * | 8/2009 | Willey et al. ...................... 52/40 |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |

(56) References Cited

FOREIGN PATENT DOCUMENTS

| | | |
|---|---|---|
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4436290 | 5/1996 |
| DE | 4444757 | 6/1996 |
| DE | 4445899 | 6/1996 |
| DE | 19501267 | 8/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19826086 | 12/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 102007042338 | 3/2009 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1425840 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 2063117 | 5/2005 |
| EP | 1568883 | 8/2005 |
| EP | 1589222 | 10/2005 |
| EP | 1612415 | 1/2006 |
| EP | 1641102 | 3/2006 |
| EP | 1792381 | 3/2006 |
| EP | 1677002 | 7/2006 |
| EP | 1772624 | 4/2007 |
| EP | 1780409 | 5/2007 |
| EP | 1788241 | 5/2007 |
| EP | 1829762 | 9/2007 |
| EP | 1881194 | 1/2008 |
| EP | 1921311 | 5/2008 |
| EP | 2102496 | 7/2008 |
| EP | 2060786 | 5/2009 |
| EP | 2063115 | 5/2009 |
| EP | 2063116 | 5/2009 |
| EP | 2143842 | 1/2010 |
| EP | 2143938 | 1/2010 |
| EP | 2143944 | 1/2010 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2613148 | 3/1988 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 0/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 56081053 | 7/1981 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9607825 | 3/1996 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0014405 | 3/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2004044419 | 5/2004 |
| WO | WO2005050008 | 6/2005 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008086608 | 7/2008 |
| WO | WO2008098573 | 8/2008 |

(56) References Cited

FOREIGN PATENT DOCUMENTS

| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi,cojp/msmw/mw/en/gearless.html, viewed Sep. 22, 2006.

* cited by examiner

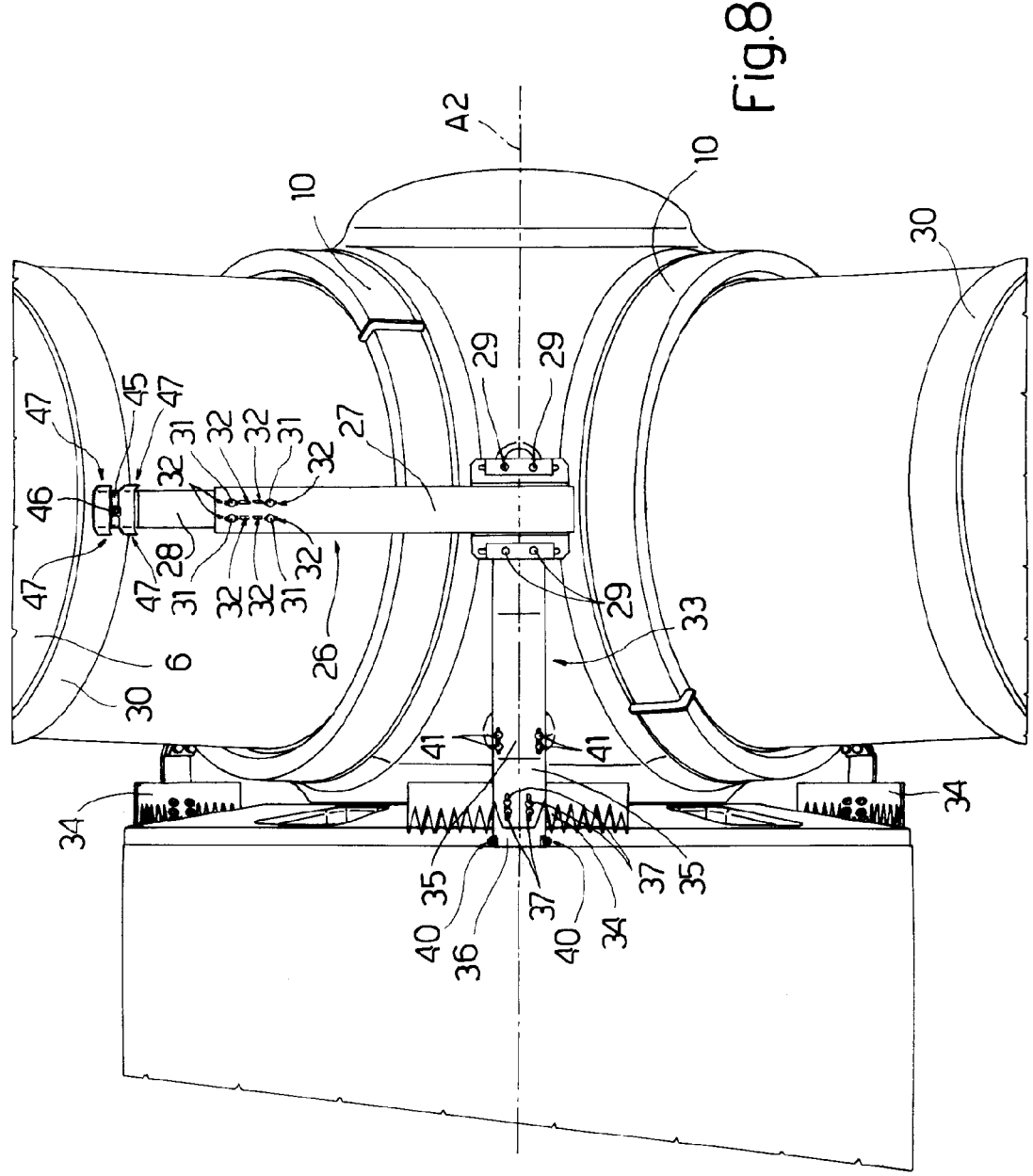

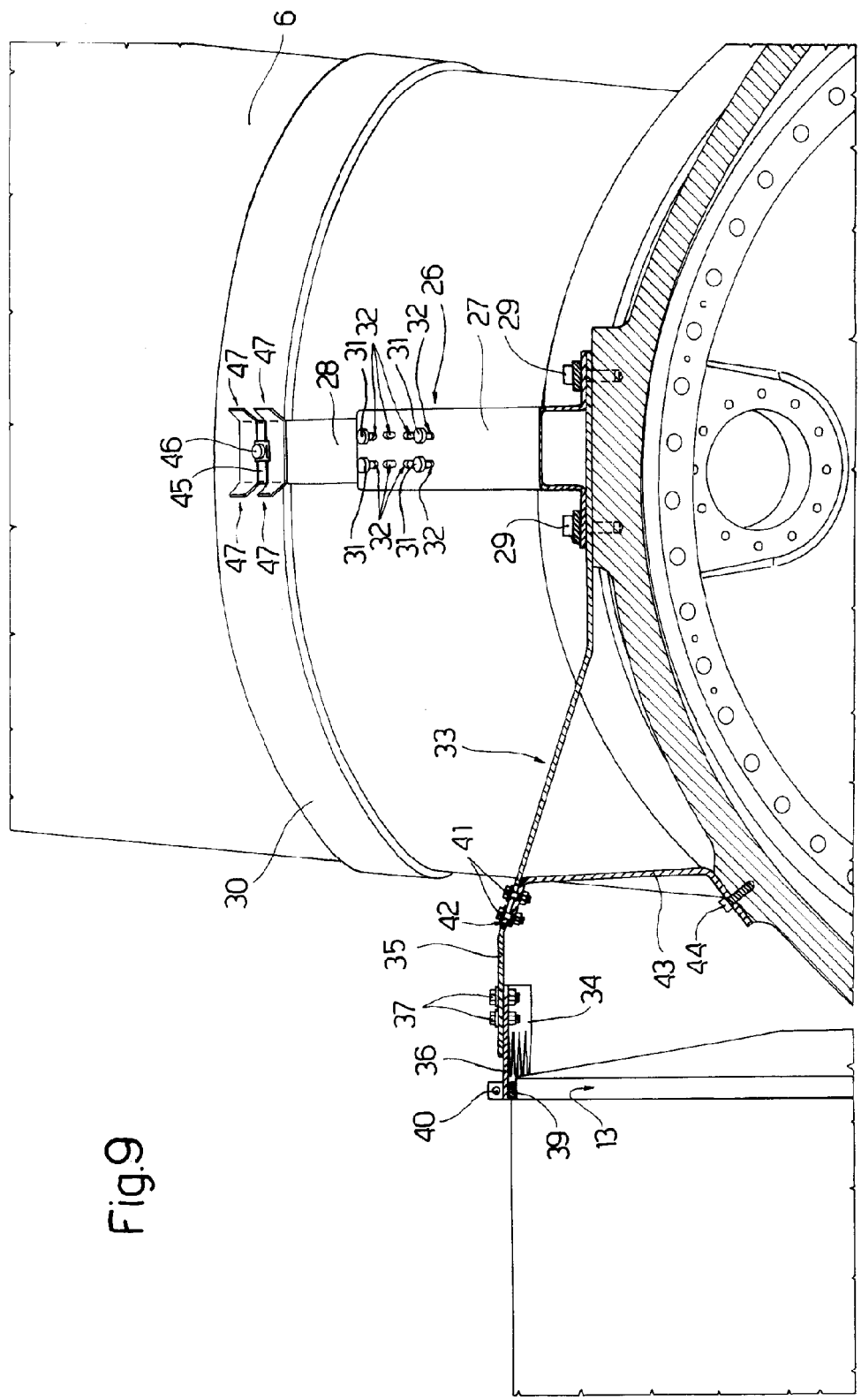

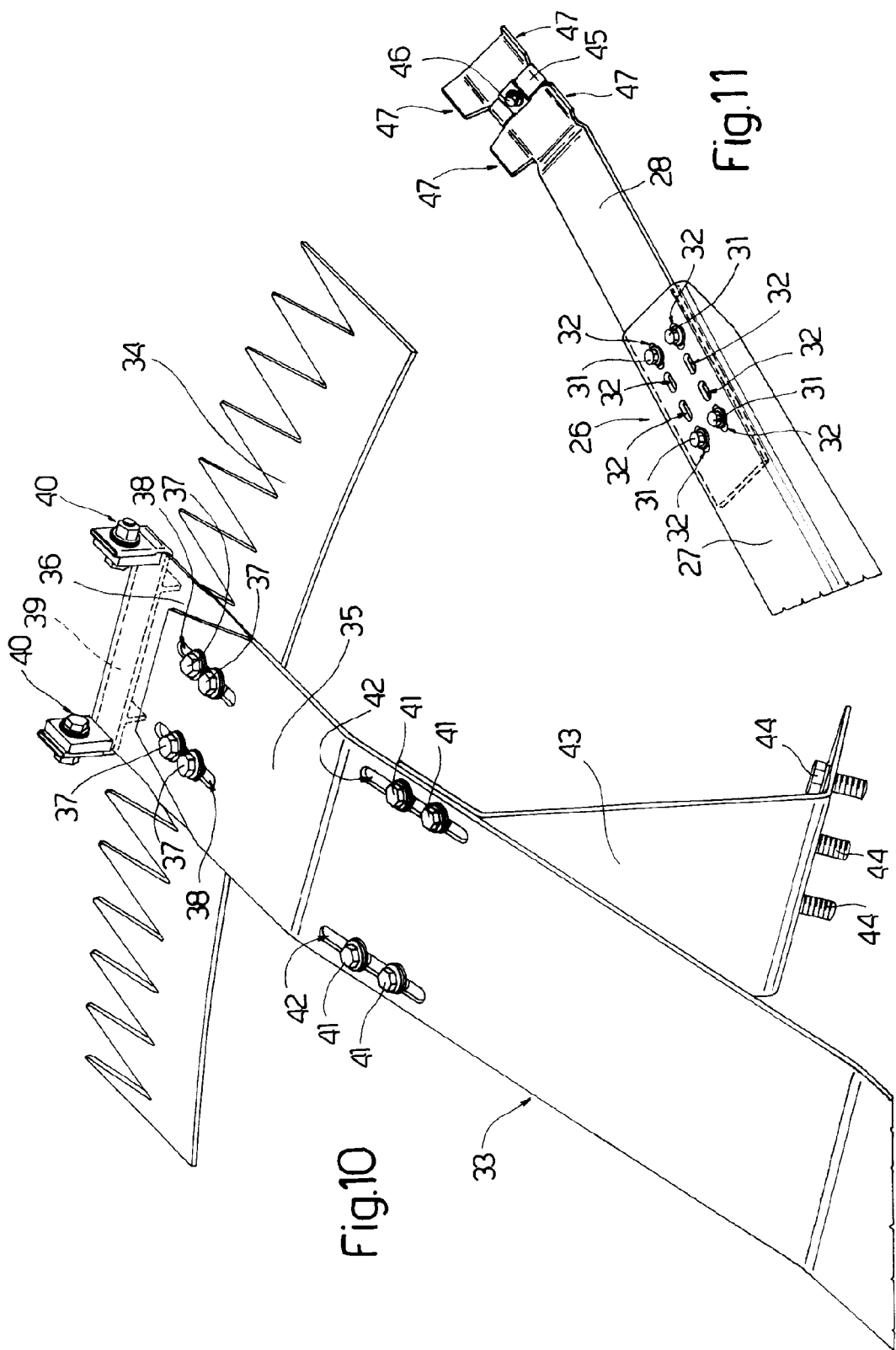

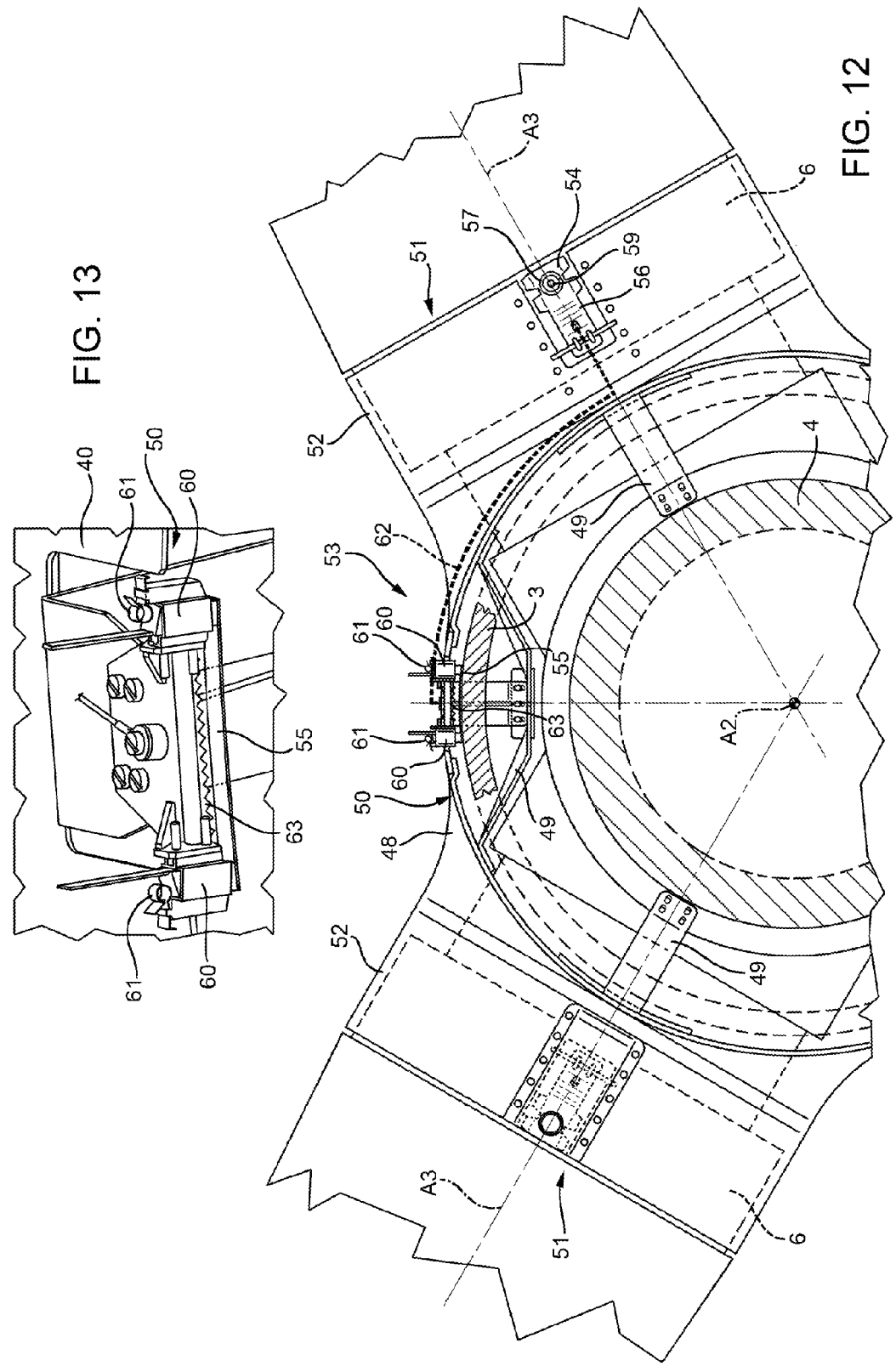

WIND POWER SYSTEM FOR GENERATING ELECTRIC ENERGY

PRIORITY CLAIM

This application is a national stage application of PCT/EP2010/055860, filed on Apr. 29, 2010, which claims the benefit of and priority to Italian Patent Application No. MI2009A 000725, filed on Apr. 29, 2009, the entire contents of which are incorporated herein.

TECHNICAL FIELD

The present disclosure relates to a wind power system for generating electric energy. More specifically, the present disclosure relates to a wind power system for generating electric energy, comprising a tower; a nacelle fitted to the tower to rotate about a first axis; a hub fitted to the nacelle to rotate about a second axis; and at least one blade fitted to the hub to rotate about a third axis.

BACKGROUND

In actual use, the wind blowing against the blade, in particular one surface of the blade, rotates the hub with respect to the second axis, thus transferring kinetic energy from the wind to the hub. Wind action on the blade causes electric charges to accumulate along the outer surface of the blade, particularly the tip. Large numbers of electric charges are also accumulated on the blade as a result of lightning striking the wind power system, and in particular the blade.

In both cases, the electric charges must be grounded, which generates electric current flow through the wind power system.

A wind power system has areas, such as the rolling bearings, that are highly sensitive to electric current, which must therefore be prevented from flowing through these areas.

A wind power system normally has at least one rolling bearing between the blade and the hub; a rolling bearing between the hub and the nacelle; and a rolling bearing between the nacelle and the tower. These rolling bearings deteriorate when subjected to electric current generated by electric charges on the blades, and particularly strong electric current produced by lightning striking the blade.

A device must therefore be provided to guide electric current away from the sensitive parts of the wind power system, as described in documents DE 4436290, DE 19826086, DE 19501267, DE 4445899, WO 00/14405, WO 96/07825, and WO 2004/044419.

Each of the above documents describes a safety device designed to guide electric current along a path that does not go through any of the sensitive parts of the wind power system. None of the devices described, however, allows for dimensional variations in the wind power system, caused by tolerances, slack, and deformation, to which both the blade and nacelle are subject. Moreover, the blade is designed to rotate about the third axis to adjust the attack angle of the blade; in which case, the distance between the blade and the hub, and therefore electric connection of the wind power system safety device, also varies, so that the wind power system is no longer adequately protected.

SUMMARY

It is an object of the present disclosure to provide a wind power system configured to reduce the drawbacks of the known art.

Another object of the present disclosure is to provide a wind power system configured to operate safely.

According to the present disclosure, in various embodiments, there is provided a wind power system for generating electric energy, comprising a tower; a nacelle fitted to the tower to rotate about a first axis; a hub fitted to the nacelle to rotate about a second axis; at least one blade fitted to the hub to rotate about a third axis; and at least one safety device positioned contacting a first area at the root of the blade, and a second area of the nacelle, so as to connect the blade electrically to the nacelle; and wherein the safety device is deformable to compensate for variations in the distance between the first and second area.

The safety device according to the present disclosure providing a deformable, electric connection can be maintained even alongside variations in the distance between the first and second area of the wind power system.

In a preferred embodiment, the safety device is deformable elastically, so that compensation is automatic.

In another preferred embodiment, the safety device is adjustable selectively, to permit fine adjustment of the position and/or length of the safety device.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which:

FIG. 8 shows a plan view of a detail of the FIG. 7 wind power system;

FIG. 9 shows a larger-scale, partly sectioned side view, with parts removed for clarity, of a detail in FIG. 7;

FIG. 10 shows a view in perspective of a detail of the FIG. 7 wind power system;

FIG. 11 shows a view in perspective of a further detail of the FIG. 7 wind power system;

FIG. 12 shows a partly sectioned elevation view, with parts removed for clarity, of a further alternative embodiment in accordance with the present disclosure;

FIG. 13 shows an enlarged perspective view, with parts removed for clarity, of a detail of FIG. 12;

DETAILED DESCRIPTION

Figure 1:
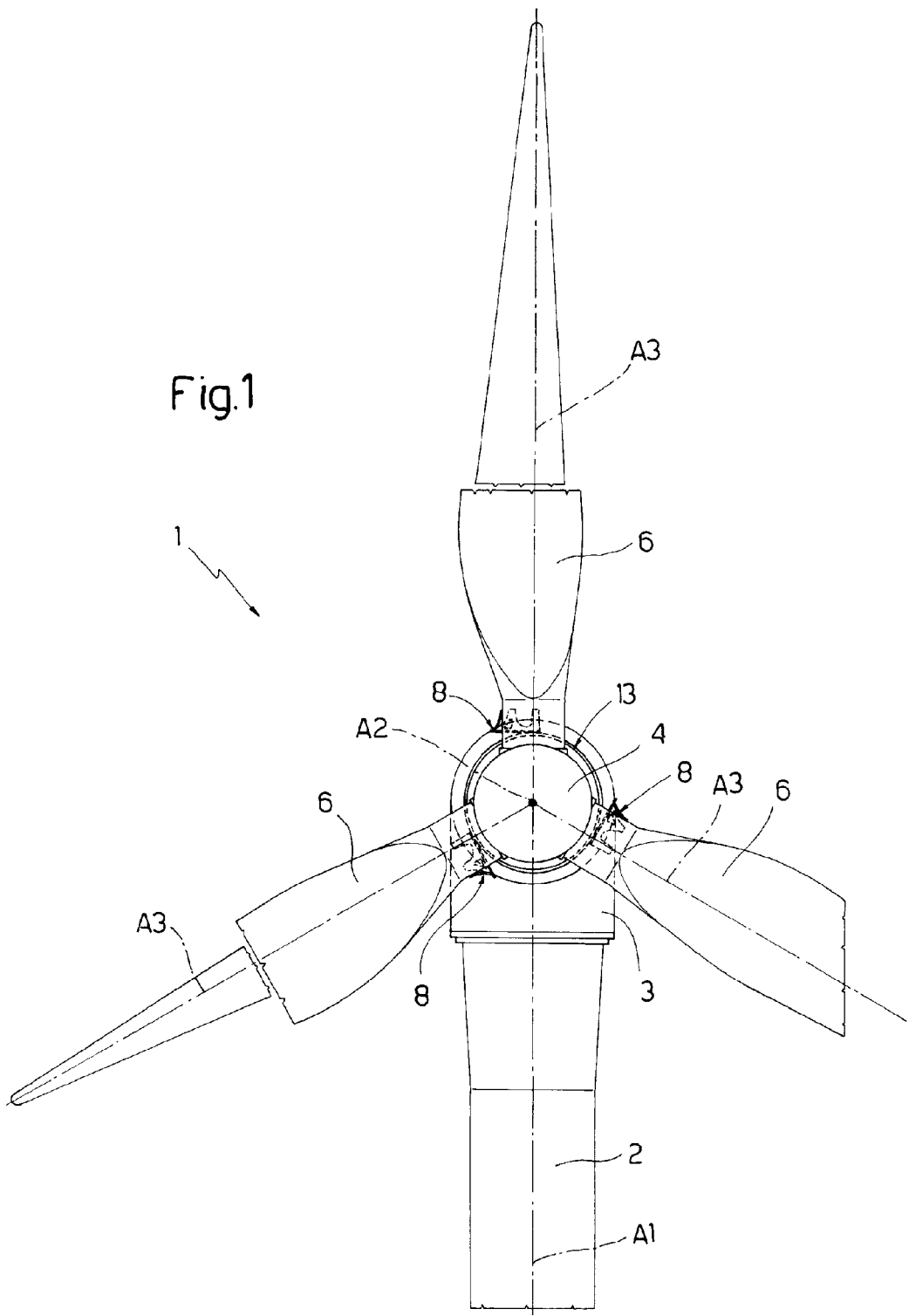
FIG. 1 shows a front view, with parts removed for clarity, of a first embodiment of a wind power system in accordance with the present disclosure.

Referring now to the example embodiments of the present disclosure illustrated in FIGS. 1 to 15, number 1 in FIG. 1 indicates as a whole a wind power system comprising a tower 2, a nacelle 3, a hub 4, three blades 6, and three safety devices 8.

The three blades 6 are fitted to hub 4, which is fitted to nacelle 3, which is in turn fitted to tower 2. More specifically, nacelle 3 is mounted to rotate about an axis A1 with respect to tower 2, so as to position blades 6 upwind, and hub is mounted to rotate about an axis A2 with respect to nacelle 3.

Each blade 6 is mounted to rotate about an axis A3 with respect to hub 4, so as to adjust the attack angle of blade 6 with respect to the wind direction. In the example shown, axis A3 is substantially perpendicular to axis A2 and radial with respect to axis A2.

Figure 3:
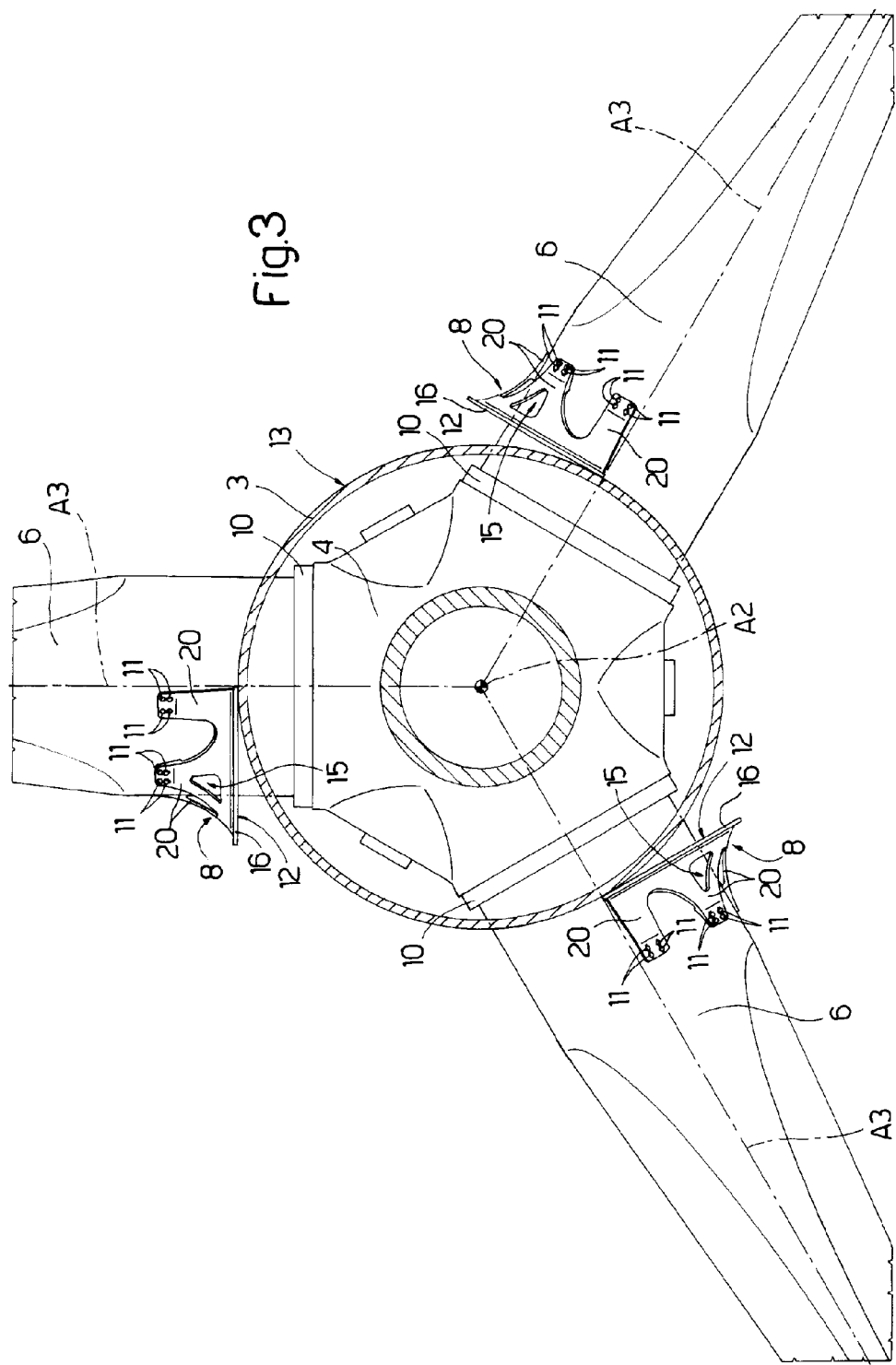
FIG. 3 shows a partly sectioned rear view, with parts removed for clarity, of the FIG. 1 wind power system in a further operating configuration.
Figure 4:
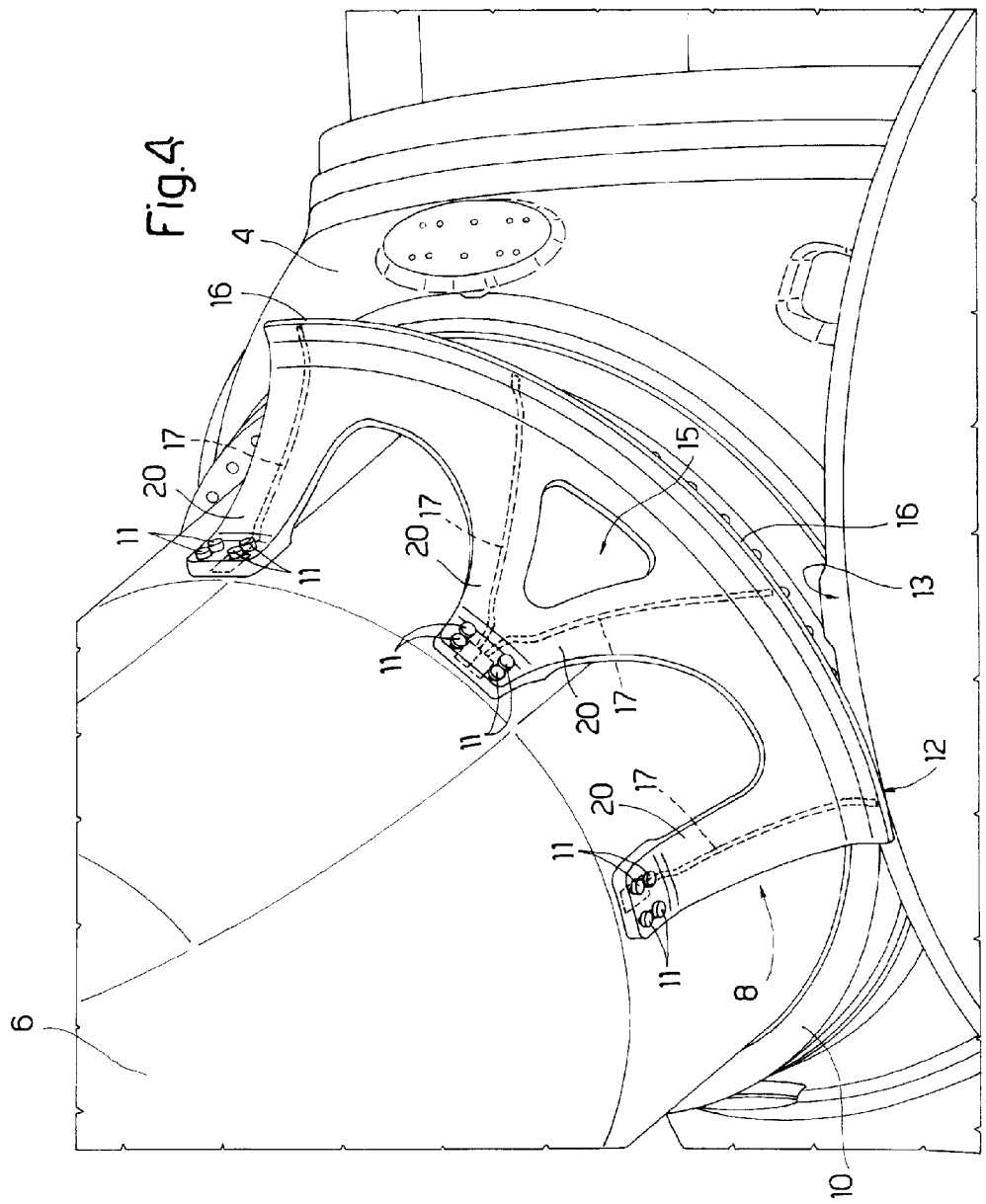
FIG. 4 shows a larger-scale view in perspective of a detail of the FIG. 1 wind power system.

With reference to FIG. 4, each blade 6 includes a connecting device 10, which connects blade 6 adjustably to hub 4, i.e. to allow blade 6 to rotate about axis A3 (FIG. 3), and includes at least one rolling bearing (not shown in the drawings).

Figure 6:
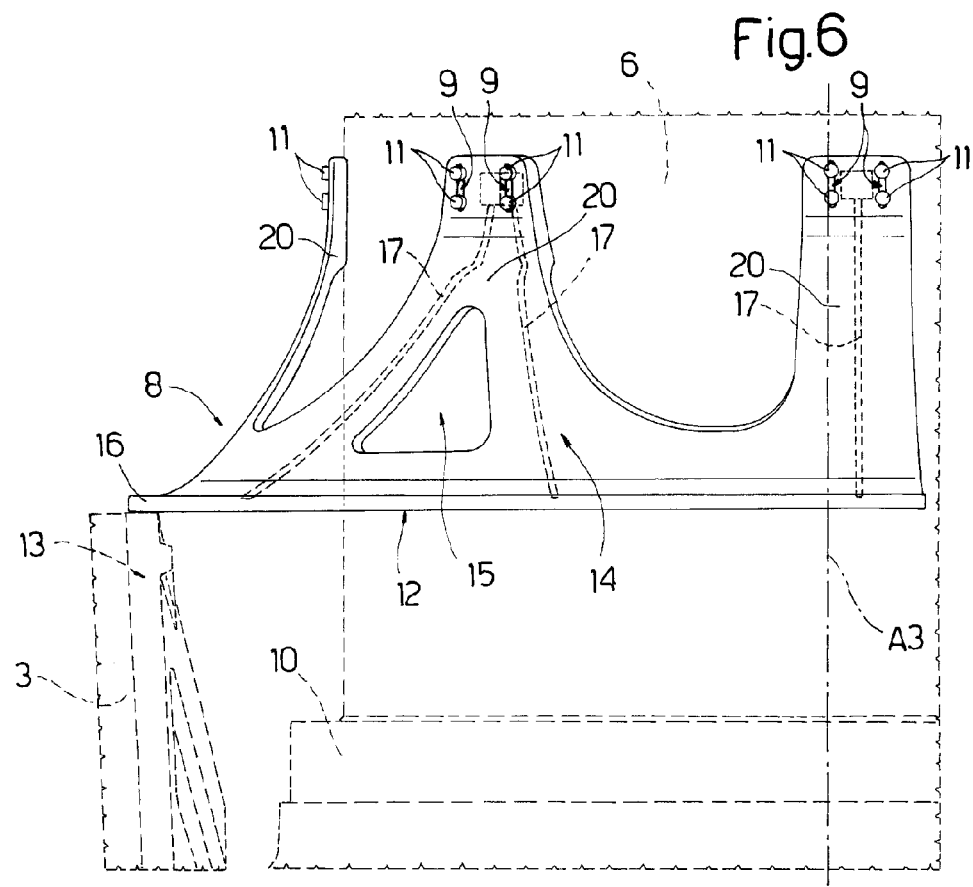
FIG. 6 shows a larger-scale side view of a detail of the FIG. 1 wind power system.

With reference to FIG. 6, in which the portions of blade 6 and nacelle 3 are shown by dash lines, this illustrated embodiment of safety device 8 is located between blade 6 and nacelle 3, and includes a fiberglass supporting structure 14 with an opening 15; a metal conducting strap 16; and at least one conducting member 17 connecting conducting strap 16 electrically to blade 6.

Figure 5:
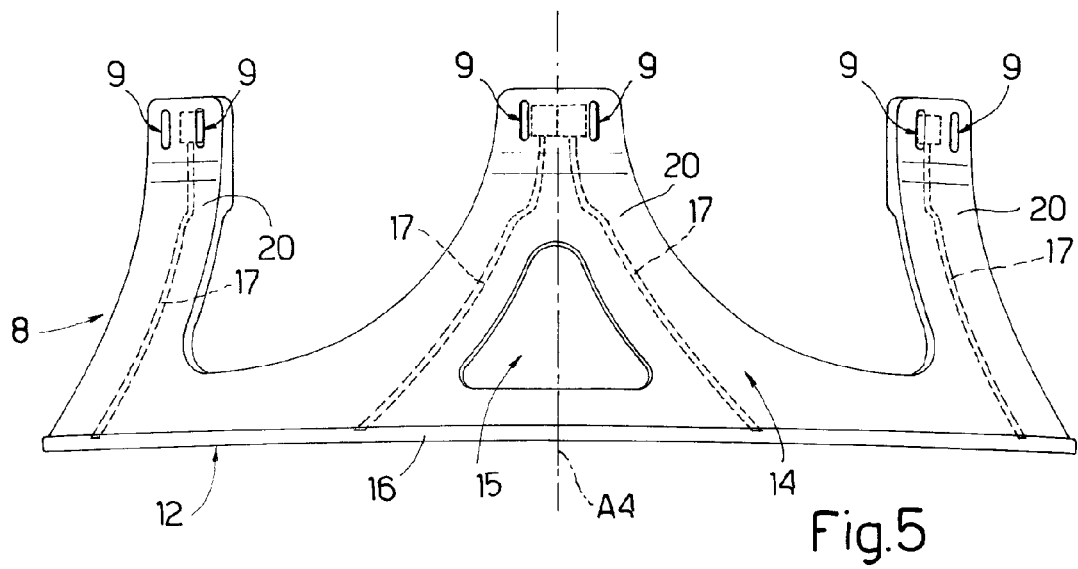
FIG. 5 shows a larger-scale elevation of a component part of the FIG. 1 wind power system.

In the FIGS. 4 to 6 example embodiment, each safety device 8 includes four conducting members 17.

With reference to FIG. 4, conducting strap 16 is made of electrically conducting material, is supported by supporting structure 14, and has a face 12; and nacelle 3 has an annular surface 13 in an area of nacelle 3 defined by the end of nacelle 3 close to hub 4.

Conducting strap 16 is pressed elastically by supporting structure 14 onto the contact area of nacelle 3, so as to establish contact between conducting strap 16 and nacelle 3 along face 12 and annular surface 13 respectively. In actual use, the contact is a sliding contact.

Each conducting member 17 is located along supporting structure 14, may be defined by an electric conductor embedded in or connected to supporting structure 14, is connected directly to conducting strap 16, and contacts an area of blade 6 to create an electric contact between the area of blade 6—substantially defined by the root of blade 6—and conducting strap 16.

With reference to FIG. 1, blade 6 includes a metal core (not shown) covered partly in fiberglass; and electric conductors (not shown) embedded in the fiberglass to transfer electric charges from the tip of blade 6 to the root, which is normally made entirely of metal.

With reference to FIGS. 5 and 6, supporting structure 14 includes connecting arms 20 configured to make supporting structure 14 elastically deformable, and which are concave outwards of blade 6. Generally speaking, the whole of supporting structure 14 is concave outwards of blade 6, to enhance the elasticity of supporting structure 14.

With reference to FIG. 6, safety device 8 includes fasteners 11 for fastening the safety device 8 to the blade 6. In the FIGS. 2, 3, 4, and 6 example, fasteners 11 are screws inserted inside slots 9 in supporting structure 14 (see FIG. 5), and screwed to blade 6. With reference to FIG. 6, slots 9 extend parallel to axis A3 to permit fine adjustment of the position of supporting structure 14 with respect to blade 6 and nacelle 3. In other words, safety device 8 is fixed adjustably to blade 6, on one side, and, on the opposite side, is in sliding contact with the contact area of nacelle 3.

Safety device 8 thus establishes an electric connection between blade 6 and nacelle 3, by which to transfer the electric current produced by environmentally-induced electric charges directly from blade 6 to nacelle 3.

Figure 2:
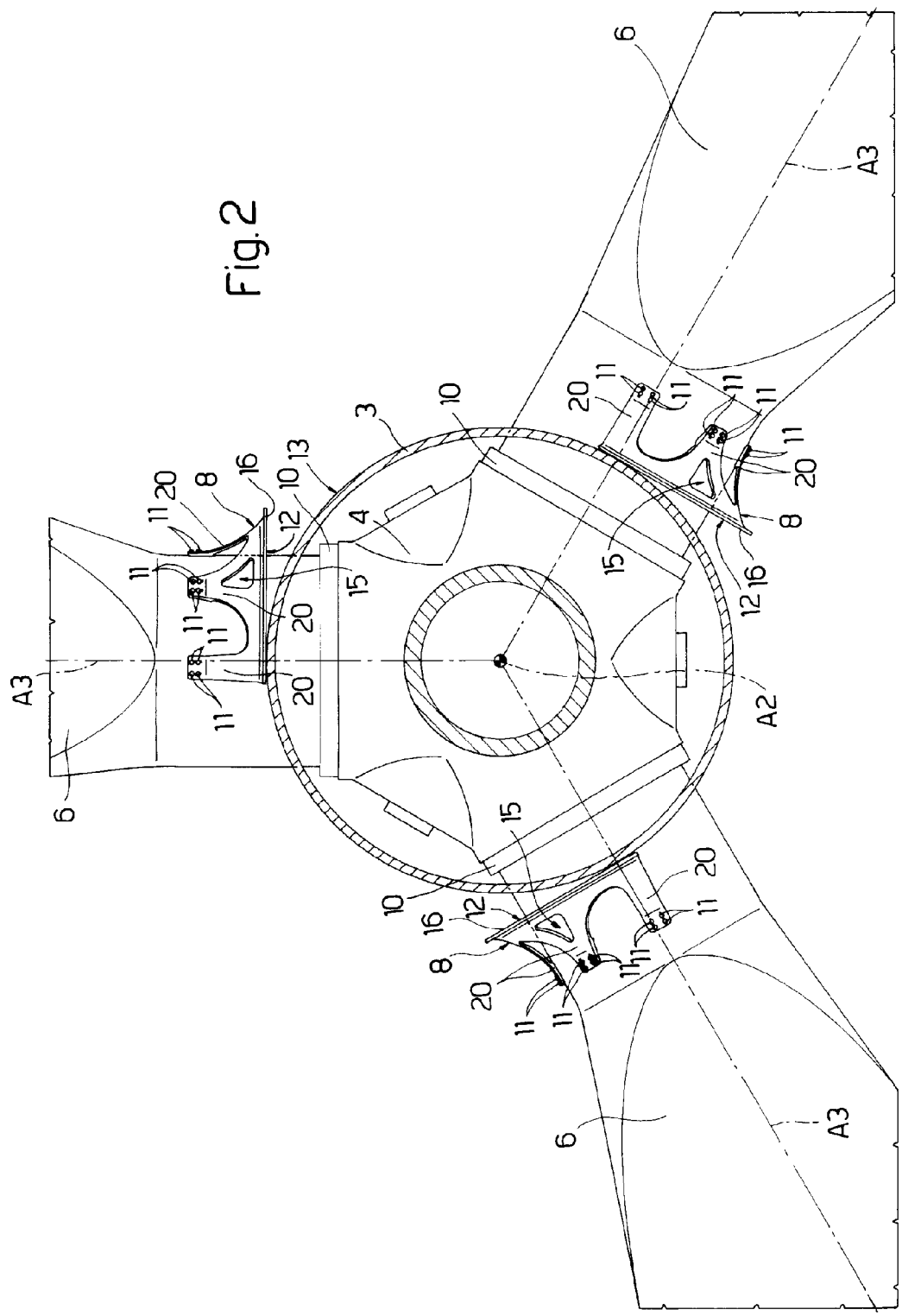
FIG. 2 shows a partly sectioned rear view, with parts removed for clarity, of the FIG. 1 wind power system in one operating configuration.

With reference to FIG. 2, blades 6 are controlled, on the basis of parameters relating to the efficiency of wind power system 1, to rotate about respective axes A3 to adjust the attack angle of each blade 6.

In actual use, blade 6 may therefore assume different operating configurations, in each of which, the electric connection established by safety device 8 must be guaranteed by ensuring safety device 8 is kept in contact at all times with the contact area of nacelle 3.

With reference to FIG. 6, conducting strap 16 extends along an arc about third axis A3 to ensure electric contact between safety device 8 and nacelle 3, regardless of the operating configuration of blade 6.

Supporting structure 14 is configured to extend 90° about axis A3.

FIG. 2 shows safety device 8 contacting the contact area of nacelle 3 with blade 6 in one operating configuration.

FIG. 3 shows blade 6 in a different operating configuration, resulting from a change in the pitch of blade 6. Regardless of the operating configuration of blade 6, safety device 8 still remains in contact with the contact area of nacelle 3.

FIGS. 7 to 11 show a second alternative embodiment of the present disclosure, in which parts similar to the first embodiment are indicated using the same reference numbers as in FIGS. 1 to 6, and safety device 8 is replaced by a safety device 25.

Figure 7:
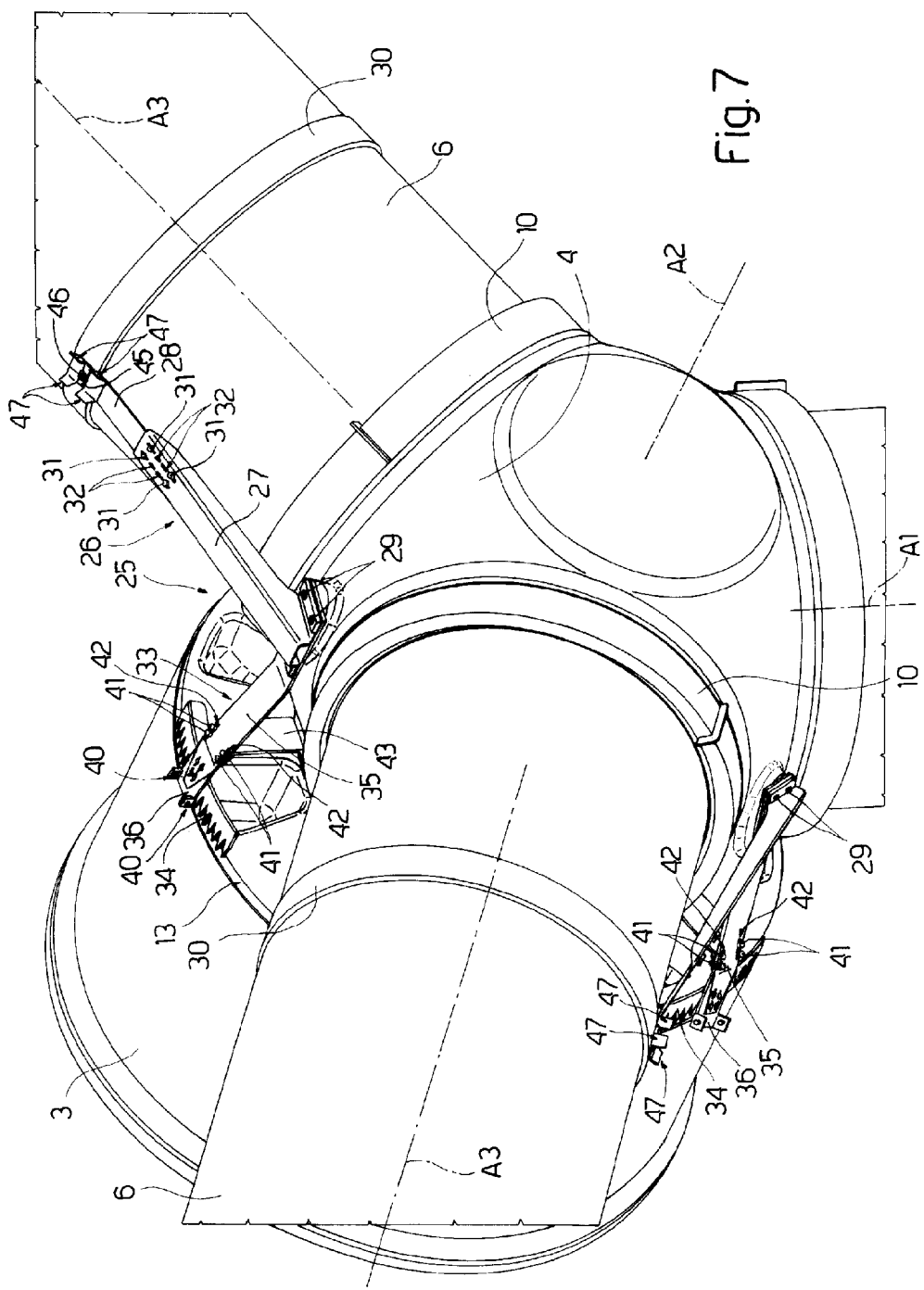
FIG. 7 shows a view in perspective, with parts removed for clarity, of a second alternative embodiment of a wind power system in accordance with the present disclosure.
Figure 14:
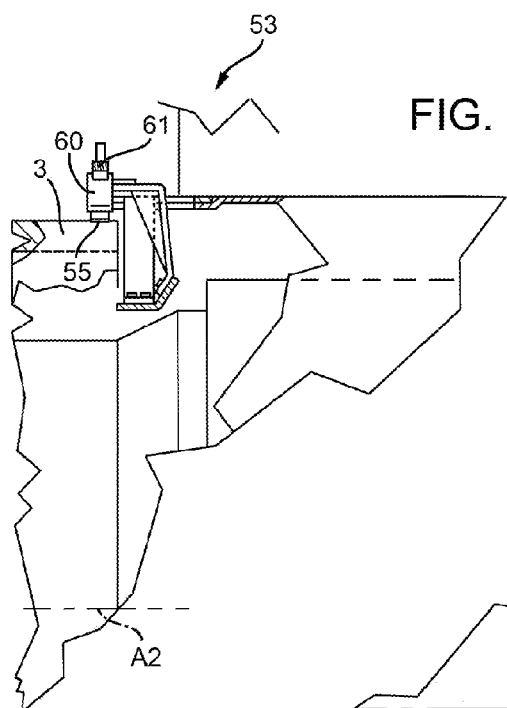
FIG. 14 shows a side elevation view, with parts removed for clarity and parts in cross section, of a detail of FIG. 12.

With reference to FIG. 7, safety device 25 includes an arm 26 having a member 27 and a member 28; screws 29; a metal conducting strap 30; an arm 33 comprising a comb 34, a central body 35, a spacer 36, and a slide 39 (see FIG. 10); and an arm 43.

With reference to FIG. 8, arm 26 is made of electrically conducting material, extends from hub 4 to blade 6, and is defined at one end by member 27, and at the opposite end by member 28. The elasticity of member 28 holds it in contact at all times with conducting strap 30 fixed to an area of blade 6; whereas member 27 is fixed rigidly to hub 4 by screws 29. The contact area of blade 6 is located at the root of blade 6, so that arm 26 forms an electric connection between blade 6 and hub 4. Members 27 and 28, in fact, are made of electrically conducting material.

With reference to FIGS. 8 and 9, member 28 is configured with a higher degree of elasticity than member 27, blade 6, and hub 4, so that the elasticity of member 28 compensates for any variation in the distance between hub 4 and the contact area of blade 6 caused by slack, tolerances, deformation, or movement of blade 6 about axis A3.

With reference to FIG. 11, arm 26 includes a slide 45 fastened to member 28 by a screw 46, so slide 45 is easily replaceable. Slide 45 is made of electrically conducting material, and is subject to wear caused by sliding friction as blade 6 rotates about axis A3, so easy replacement of slide 45 greatly reduces the downtime of wind power system 1. Moreover, member 28 has a number of fins 47 about slide 45 to avoid obstacles on conducting strap 30 as blade 6 rotates about axis A3.

With particular reference to FIG. 11, arm 26 includes adjusting screws 31; members 27 and 28 each have respective slots 32; and member 28 is fixed to member 27 by adjusting screws 31, which are housed in slots 32 to permit fine adjustment of the position of member 28 with respect to member 27. The position of the adjusting screws 31 depends on the desired position of member 28 with respect to member 27. The degree of elasticity of arm 26, in fact, is adjustable by adjusting the position of member 28 with respect to member 27; and members 27 and 28 each have eight slots 32 enabling different fastening configurations.

With reference to FIG. 7, arm 33 is made of electrically conducting material and located between hub 4 and nacelle 3. More specifically, the central body 35 of arm 33 is fixed rigidly at one end to hub 4 and arm 26 by screws 29, and is fixed at the opposite end to spacer 36 and comb 34. Cursor 39 (see FIG. 10) of arm 33 is fixed to spacer 36 and positioned contacting annular surface 13 of nacelle 3; and central body 35, spacer 36, comb 34, and cursor 39 are all made of electrically conducting material.

With reference to FIG. 10, spacer 36 is located radially outwards of comb 34 with respect to axis A2; and spacer 36 and comb 34 are aligned radially about axis A2.

Comb 34 is located a given distance from nacelle 3, and is configured to form an electric connection to the contact area of nacelle 3.

With reference to FIG. 10, both spacer 36 and comb 34 are fixed adjustably to central body 35 of arm 33 by adjusting screws 37 forming part of arm 33, and by slots 38 in central body 35. Adjusting screws 37 permit fine adjustment of the position of spacer 36 with respect to annular surface 13 of nacelle 3, and of the position of comb 34 with respect to the contact area of nacelle 3 and therefore also with respect to spacer 36.

Arm 33 is supported by arm 43, which is fixed rigidly at one end to hub 4 by screws 44 forming part of wind power system 1, and is fixed to arm 33 at the opposite end. More specifically, arm 33 includes adjusting screws 41; and slots 42 formed in central body 35. Adjusting screws 41 fit through slots 42 to fix central body 35 of arm 33 to arm 43. Assembly by adjusting screws 41 and slots 42 permits fine adjustment of the degree of elasticity of arm 33, by adjusting the position of adjusting screws 41 inside slots 42.

Spacer 36 includes bolts 40, which fix slide 39 to spacer 36, so that slide 39 faces annular surface 13 of nacelle 3. In actual use, arm 33 is in sliding contact with nacelle 3. More specifically, slide 39 is in sliding contact with nacelle 3, and is subject to wear caused by sliding friction, so assembly of slide 39 by bolts 40 makes it easy to replace, and drastically reduces downtime of wind power system 1 for maintenance.

Accurate fine adjustment of the elasticity of arm 33 and the position of spacer 36 with respect to nacelle 3 ensures contact—in particular, sliding contact—between slide 39 of spacer 36 and annular surface 13 of nacelle 3, so that any electric charges formed on blade 6 by air particles rubbing against blade 6 pass through slide 39.

Accurate fine adjustment of the position of comb 34 with respect to nacelle 3 also ensures, thanks also to spacer 36, that comb 34 is always at the given distance from the contact area of nacelle 3; which given distance is configured to ensure that, when lightning strikes blade 6, the resulting electric current is grounded predominantly through comb 34 as opposed to spacer 36.

Fine adjustment of the position of spacer 36, the position of comb 34, and the elasticity, may be made both at the initial assembly stage and as part of routine maintenance of wind power system 1.

Electric current produced by rubbing-induced electric charges, and electric current produced by lightning have different frequencies, and therefore follow two different paths, at least in the comb 34 and spacer 36 areas. Accordingly, the shape, size, and location of comb 34 are configured so that electric current produced by lightning can flow through it and use it as a preferential path to nacelle 3; whereas spacer 36 and slide 39 are shaped and sized so that electric current produced by air rubbing against blade 6 uses them as a preferential path from blade 6 to nacelle 3.

In a variation (not shown) of the second embodiment, arm 26 is replaced by two rigid, electrically conducting members connected to each other by a spring, so sliding contact is guaranteed by the spring holding one of the two rigid members in contact at all times with the sliding support.

With reference to FIG. 12 the wind power system 1 includes a shell 48, which is supported by the hub 4 and houses the hub 4 and the roots of the blades 6. The shell 48 is kept at given distance from hub 4 and blade by supporting members 49, is usually made of fiberglass, and has an aerodynamic shape.

Figure 15:
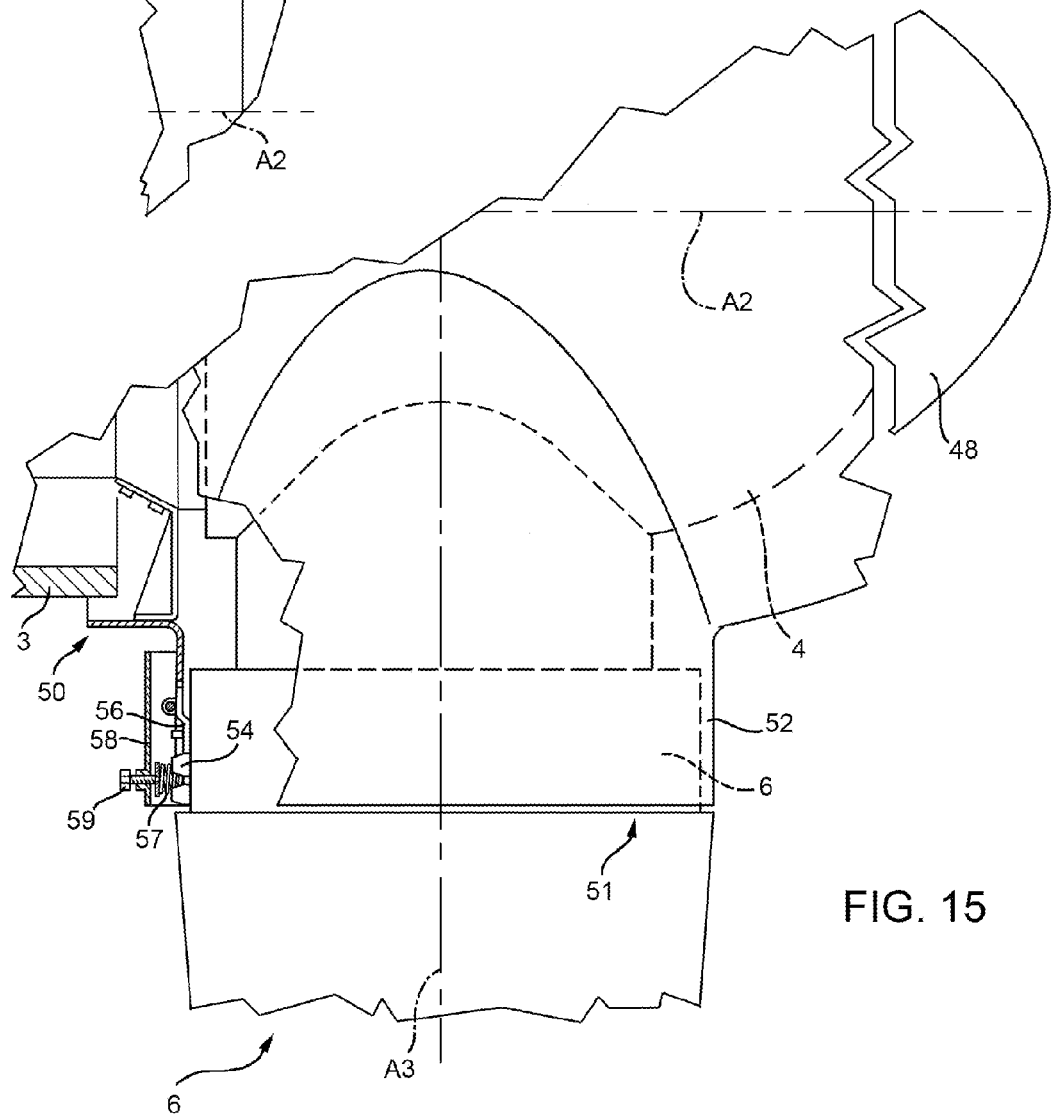
FIG. 15 shows a side elevation view, with parts removed for clarity and parts in cross-section, of further detail of the embodiment of FIG. 12.

The shell 48 has an annular edge 50 facing the nacelle 3 as better shown in FIG. 15, and openings 51, each occupied by the root of a blade 6. In particular, at each opening 51 the shell 48 comprises a sleeve 52 extending about the root of a blade 6.

The wind power system 1 includes a safety device 53 for each blade 6 for electrically connecting each blade 6 to the nacelle 3.

The safety device 53 includes a slide 54 supported by the shell 48 at said opening 51, and in sliding contact with the root of the blade 6; and a slide 55 supported by the shell 48 at said annular edge 50 in sliding contact with the nacelle 3.

The slides 54 and 55 are elastically pressed against respectively the root of the blade 6 and the nacelle 3.

In particular and with reference to FIG. 15, the slide 54 is supported by an arm 56, which is pivotally connected to the shell 48; in particular to the sleeve 52, and is pressed by a spring 57 fitted to a cover 58 mounted to the shell 48. The force of the spring 57 is adjustable by means of a screw 59 mounted on the cover 58.

With reference to FIG. 13, the slide 55 is slideably mounted in a guide 60, which is supported by the shell 48 so as to adjust the position of the slide 55 with respect to shell 48. In particular the guide 60 is mounted at the edge 50 of the shell and is arranged so as to enable a radial displacement of the slide 55. The slide 55 is pressed against an annular surface of the nacelle 3 by way of springs 61 as better shown in FIGS. 12 and 14.

Slides 55 and 55 are connected to one another by a wire 62.

With reference to FIG. 13, the safety device 53 includes a comb 63, which is arranged at the annular edge 50 and preferably in close proximity of the slide 55; and faces the nacelle 3.

This further embodiment has the advantages that the hub 4 is isolated from the electric current path, and the safety device is nearly fully contained inside the shell and, then, preserves the efficient aerodynamic profile, and the outer appearance of the wind turbine system. Further, the slides enable the transfer of rather high electric current and the safety device compensates the variations in distance that may occur between the blades and the nacelle.

In all the above embodiments, electric charges produced by lightning or by air rubbing against blade are directed from nacelle to tower by a connecting cable (not shown) long enough to allow rotation of the nacelle about axis A1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind power system for generating electric energy, said system comprising:
a tower;
a nacelle fitted to the tower to rotate about a first axis;
a hub fitted to the nacelle to rotate about a second axis;
blade fitted to the hub to rotate about a third axis; and
a safety device contacting a first area at a root of the blade and a second area of the nacelle to connect the blade electrically to the nacelle, the safety device being deformable to compensate for variations in distance between the first area and the second area.

2. The wind power system of claim 1, wherein the safety device is deformable elastically.

3. The wind power system of claim 1, wherein the safety device is selectively adjustable.

4. The wind power system of claim 1, which includes a shell which is electrically insulated from the hub, extends about the hub and the root of the blade and includes an annular edge adjacent to the nacelle and an opening housing the root of the blade; and wherein the safety device includes a first slide supported by the shell at said opening in sliding contact with the root of the blade, and a second slide supported by the shell at said annular edge in sliding contact with the nacelle.

5. The wind power system of claim 4, wherein the first and the second slides are respectively elastically pressed against the root of the blade and the nacelle.

6. The wind power system of claim 5, wherein the first slide is supported by an arm pivotally connected to the shell.

7. The wind power system of claim 4, wherein the second slide is slideably mounted in a guide, which is arranged to allow a radial displacement of the second slide.

8. The wind power system of claim 4, wherein the first and the second slides are connected to one another by a wire.

9. The wind power system of claim 4, wherein the safety device includes a comb which is arranged at the annular edge in close proximity to the second slide, and which faces the nacelle.

10. The wind power system of claim 1, wherein the safety device is fixed adjustably to the first area, and is in sliding contact with the second area.

11. The wind power system of claim 10, wherein the safety device includes an elastically deformable supporting structure, a first conducting strap supported by the supporting structure, and is positioned contacting the second area; and at least one conducting member for connecting the first conducting strap to the blade at the first area.

12. The wind power system of claim 11, wherein the first conducting strap extends along an arc about the third axis, to ensure electrical contact regardless of the operating configuration of the blade with respect to the hub.

13. The wind power system of claim 11, wherein the supporting structure is made of fiberglass.

14. The wind power system of claim 11, wherein the supporting structure includes connecting arms; the conducting member is in the supporting structure; and said connecting arms are elastically deformable.

15. The wind power system of claim 14, wherein the connecting arms are elastically bendable.

16. The wind power system of claim 1, wherein the safety device includes a first arm connected mechanically and electrically to the hub and the nacelle, and having a first end fixed to the hub, and a second end in sliding contact with the second area.

17. The wind power system of claim 16, wherein the safety device includes a second arm having a third end fixed to the hub, and a fourth end in sliding contact with the first area and configured to connect the hub electrically to the first area.

18. The wind power system of claim 16, wherein the first arm is fixed adjustably to a third arm fixed to the hub to adjust a degree of elasticity of the first arm.

19. The wind power system of claim 16, wherein the safety device includes a comb connectable electrically to the nacelle to define a preferential path for electric charges caused by lightning; the comb being located between the hub and the nacelle, and being selectively adjustable.

20. The wind power system of claim 19, wherein the safety device includes a first slide; said first slide being pressed elastically on the second area, in sliding contact with the second area, and connectable electrically to the nacelle to define a preferential path for electric charges caused by air rubbing the blade.

21. The wind power system of claim 20, wherein the safety device includes a spacer, and at least one first adjusting screw; the first arm including a central body defining at least one first slot; the spacer being fixed adjustably to the central body by the first adjusting screw and the first slot, to adjust the position of the spacer with respect to the nacelle; the first slide being fixed to the spacer and interchangeable; and the position of the spacer being adjusted so the first slide contacts an annular surface of the nacelle.

22. The wind power system of claim 21, wherein the comb is connected adjustably to the central body to adjust a distance between the comb and the nacelle.

23. The wind power system of claim 21, wherein the comb is connected adjustably to the central body by the first adjusting screw and the first slot, to adjust a distance between the comb and the nacelle.

24. The wind power system of claim 22, wherein the distance between the comb and the nacelle is predetermined, to form a preferential path for electric charges produced by lightning striking the blade.

25. The wind power system of claim 17, wherein the safety device includes a second conducting strap located at the first area, the second conducting strap being in sliding contact with the second arm to connect the blade electrically to the second arm, and the second conducting strap extends along an arc about the third axis.

26. The wind power system of claim 25, wherein the second arm includes a first member, a second member, and at least one second adjusting screw; the first member and the second member each defining at least one second slot; and the second member being connected adjustably to the first member by the second adjusting screw and the second slot, to adjust the position of the second member with respect to the first member, and adjust the degree of elasticity of the second arm.

27. The wind power system of claim 26, wherein the second member includes a second slide and at least one screw; the second slide being fixed to the second member by the screw, and being interchangeable; and the position of the second member and the degree of elasticity of the second arm being adjustable, so the second slide is maintained contacting the second conducting strap.

28. The wind power system of claim 1, which further includes a plurality of blades, each blade being equipped with one of a plurality of safety devices.

* * * * *